United States Patent [19]

Takasu et al.

[11] Patent Number: 5,069,855
[45] Date of Patent: Dec. 3, 1991

[54] PROCESS FOR PREPARING ROLLED HEAT-TREATED FILMS OR SHEETS

[75] Inventors: Hiroshi Takasu; Susumu Arase; Junichiro Yokota, all of Chiba; Kazuo Nakayama, Ibaragi, all of Japan

[73] Assignees: Chisso Corporation; Agency of Industrial Science and Technology, both of Japan

[21] Appl. No.: 395,435

[22] Filed: Aug. 17, 1989

[30] Foreign Application Priority Data

Aug. 18, 1988 [JP] Japan .................................. 63-203747

[51] Int. Cl.$^5$ .............................................. B29C 71/02
[52] U.S. Cl. .................................. 264/235; 264/210.2; 264/280; 425/363
[58] Field of Search ............... 264/280, 288.4, 210.1, 264/510.2, 235, 235.6, 346; 425/363

[56] References Cited

U.S. PATENT DOCUMENTS

| | | | |
|---|---|---|---|
| 3,503,843 | 3/1970 | Williams, Jr. et al. | 264/210.2 |
| 3,570,052 | 3/1971 | Reade | 425/363 |
| 3,875,284 | 4/1975 | Sasaguri et al. | 264/280 |
| 4,235,834 | 11/1980 | Vetter et al. | 264/280 |
| 4,256,687 | 3/1981 | Yazaki et al. | 264/280 |
| 4,310,485 | 1/1982 | Dauber | 264/280 |
| 4,514,351 | 4/1985 | Kaeufer et al. | 264/280 |

FOREIGN PATENT DOCUMENTS

| | | | |
|---|---|---|---|
| 52-77180 | 6/1977 | Japan | 264/210.1 |
| 53-130768 | 11/1978 | Japan | 264/288.4 |
| 54-111579 | 8/1979 | Japan | |
| 57-59721 | 4/1982 | Japan | |
| 59-145141 | 8/1984 | Japan | |

*Primary Examiner*—Jeffery Thurlow
*Attorney, Agent, or Firm*—Leydig, Voit & Mayer

[57] ABSTRACT

The present invention provides a process for preparing rolled heat-treated films or sheets of a crystalline thermoplastic resin in which heat shrinkage is notably improved, formability is excellent and tensile strength in a transverse direction is increased. The process of the present invention comprises the steps of rolling a crystalline thermoplastic resin material between at least one pair of rolls at a temperature which is lower than the melting point of the resin material but higher than room temperature, and then successively subjecting the resin material to a heat treatment at a temperature which is higher than the rolling temperature but lower than the melting point of the resin material. The heat treatment is carried out for a time (t: seconds) satisfying the formula $$\frac{0.641 \times d \times r \times (Tm - Ta)}{(Ta - Tr)^{0.5}} \leq t \leq 120$$

wherein d is the thickness (mm) of the rolled films or sheets, r is the thickness reduction rate of the rolled films or sheets, Tr is the rolling temperature (°C.), Ta is the heat treatment temperature (°C.), and Tm is the melting point (°C.) of the crystalline resin.

9 Claims, 1 Drawing Sheet

GAGE LENGTH AB :
LONGITUDINAL DIRECTION

GAGE LENGTH CD :
TRANSVERSE DIRECTION

UNIT: mm

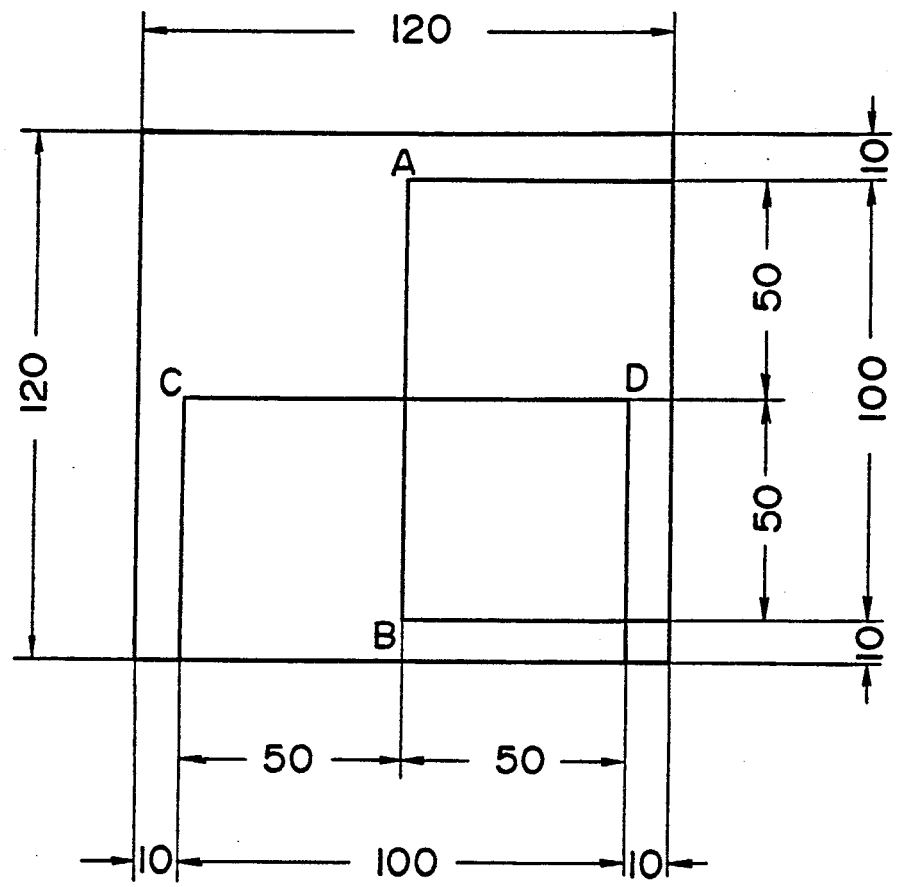
GAGE LENGTH AB :
LONGITUDINAL DIRECTION
GAGE LENGTH CD :
TRANSVERSE DIRECTION
UNIT: mm
FIG. I

PROCESS FOR PREPARING ROLLED HEAT-TREATED FILMS OR SHEETS

BACKGROUND OF THE INVENTION

1. Field of the Invention

The present invention relates to a process for preparing rolled films or sheets of a crystalline thermoplastic resin in which heat shrinkage is notably improved, and particularly it relates to a process for preparing rolled films or sheets having excellent formability and improved tensile strength in a transverse direction.

2. Description of the prior Art

Most films and sheets obtained from a crystalline thermoplastic resin by melt extrusion are widely used, for example, directly as various containers, automobile parts, appliance parts, packing materials and the like, and they are subsequently subjected to fabrications such as vacuum forming, pressure forming and press forming.

However, the melt-extruded films or sheets have drawbacks such as low stiffness and poor transparency due to crystallisability.

In order to improve the stiffness and transparency, it has been attempted to subject the films or sheets to rolling treatment. However, when the films or sheets are rolled, crystalline portions and amorphous portions thereof are uniaxially oriented in a longitudinal direction, and as a result, the following problems arise.

The rolled films or sheets have great anisotropy, and therefore when they are subjected to thermal forming such as vacuum forming, pressure forming or press forming, noticeable heat shrinkage occurs in a longitudinal direction, with he result that melt tension increases, which makes the forming operation difficult. In addition, when the preheating temperature is raised so as to lower the melt tension, the sheets break, and thus the forming is impossible. Even if the forming can be made, strain remains in formed articles owing to the strong anisotropy, and for this reason, warp phenomenon and spring back phenomenon take place. Here, the spring back phenomenon is that the formed articles act to return to their shape before formed. As a result of the above-mentioned phenomena, the desirable shape of the formed articles cannot be maintained, and dimensional stability thereof is bad.

SUMMARY OF THE INVENTION

An object of the present invention is to provide a process for preparing rolled heat-treated films or sheets of a crystalline thermoplastic resin in which heat shrinkage is notably improved, formability is excellent, and tensile strength in a transverse direction is increased.

That is, the present invention is directed to a process for preparing rolled heat-treated films or sheets which comprises the steps of rolling a crystalline thermoplastic resin material between at least one pair of rolls at a temperature which is lower than the melting point of &he resin material but higher than room temperature, and then successively subjecting the obtained rolled films or sheets to a heat treatment at a temperature which is higher than the rolling temperature but lower than the melting point of the resin material, the heat treatment being carried out for a time (T: seconds) satisfying the formula $$\frac{0.641 \times d \times r \times (Tm - Ta)}{(Ta - Tr)^{0.5}} \leq t \leq 120$$

preferably the formula $$\frac{1.282 \times d \times r \times (Tm - Ta)}{(Ta - Tr)^{0.5}} \leq t \leq 120$$

wherein d is a thickness (mm) of the rolled films or sheets. r is a thickness reduction (%) of the rolled films or sheets, Tr is the rolling temperature (° C), Ta is the heat treatment temperature (° C), and Tm is the melting point (°C) of the crystalline resin.

In the present invention, the rolling operation is performed so that a ratio /w) of the transverse length. i.e., width (W) of the film or sheet after the rolling to the transverse length, i.e , width (w) of the film or sheet before the rolling may be preferably 1. or less, more preferably 1.05 or less, most preferably 1.01 or less, and so that a thickness reduction of the rolled film or sheet may be preferably in the range of from 30% to 90%.

Furthermore,. in the heat treatment of the present invention, tension in a longitudinal direction which is applied to the rolled film or sheet is such that ratio (B/b) Of the transverse length, i.e., width (B of the rolled film or sheet after the heat treatment to the transverse length, i.e., width b) of the rolled film or sheet before the heat treatment is preferably 0.8 or more, more preferably 0.9 or more, most preferably 0.95 or more.

DETAILED DESCRIPTION OF THE INVENTION

The inventors of the present application have intensively researched to solve the above-mentioned problems. As a result, they have found that when rolled film or sheet of a crystalline thermoplastic resin are subjected to a heat treatment under specific conditions, heat shrinkage of the rolled film or sheet at the time of forming is inhibited, so that formability, shape retention and dimensional stability of formed articles are improved. Surprisingly, it has also be found that tensile strength in a transverse direction is improved which effect has not been predicted. On the basis of this knowledge, the present invention has been achieved.

As the crystalline thermoplastic resin used in the present invention, any material resin is acceptable, so long as it is a thermoplastic? resin having crystallisability. Example of the usable crystalline thermoplastic resin include homopolymers such as polyethylene, polypropylene, polybutene-1, poly(4-methylpentene-1); polyolefin resins such as copolymers of mainly ethylene or propylene and other a-olefins or polar monomers; polyamide resins such as 6-nylon, 6,6-nylon, 12-nylon and 11-nylon; polyester resins such as polyethylene terephthalate and polybutylene terephthalate: polyacetal resins and mixtures thereof. In addition, modified resins are also usable which can be prepared by copolymerization of the above-mentioned resins and unsaturated carboxylic acids such as maleic acid, acrylic acid and fumaric acid, or derivatives such as anhydrides and esters thereof and which can be prepared by an ionizing radiation treatment or a crosslinking treatment using a crosslinking agent.

In the present invention, any kind of filler can be added to the crystalline thermoplastic resin. Examples of the usable filler include fibrous fillers such as glass fiber and vinyl on fiber flaky fillers such as mica and talc, a spherical filler such as glass beads, and an amorphous filler such as calcium carbonate, wood chips and wood flours. In addition to the fillers, extenders. colorants, flame retardants, deterioration inhibitors, antistatic agents and lubricants may be also used.

The rolling technique in the present invention is not particularly restrictive, and therefore a known rolling manner can be employed. However, it is preferred hat the rolling is carried out at a temperature less than the melting point of the crystalline thermoplastic resin but more than room temperature in the longitudinal direction of the material through at least one pair of rolls so that a ratio of the transverse length, i.e., width (W) of the film or sheet after the rolling to the transverse length, i.e., width (w) of the film or sheet before the rolling may be 1.1 or less, preferably 105 or less, more preferably 1.01 or less.

When the film or sheet is rolled at a temperature higher than the melting point of the crystalline thermoplastic resin, the film or sheet is melted, so that the rolling effect of improving tensile strength and modulus of elasticity cannot be obtained, and the melted resin tends to adhere to the surfaces of the rolls.

When the rolling temperature is lower than room temperature, deforming resistance is great, and hence it is difficult to provide the film or sheet with uniform deformation.

When the ratio (W/w) of the width (W) of the film or sheet after the rolling the width (w) of the film or sheet before the rolling is in excess of 1.1, the tensile strength in the transverse direction of the rolled film or sheet is not improved, even when the heat treatment has been made.

If necessary, the rolling operation may be repeated, and the film or sheet may be preheated prior to the rolling step.

The thickness reduction (r:%) in the present invention can be represented by the following formula regarding the thickness (H) of the film or sheet before the rolling and that (h) of the film or sheet after the rolling:

$$r = 100 \times (H-h)/H.$$

The thickness reduction of the rolled film or sheet is preferably in the range of 30% to 90%. When the thickness reduction is less than 30%, transparency of the rolled film or sheet is not improved sufficiently, so that the opaque film or sheet is prepared.

When the thickness reduction is more than 90%, deforming resistance is great, and therefore the cost of a rolling device increases noticeably. Thus, such a high thickness reduction is scarcely applied to industrial production.

The heat treatment in the present invention is not particularly restrictive, and therefore a known treatment manner can be employed. However, the heating should be carried out at a temperature lower than the melting point of the resin but higher than the rolling temperature, and tension in a longitudinal direction which is applied at the time of the heat treatment of the film or sheet should be such that the ratio (B/b) of the width (B) of the film or sheet after the heat treatment to the width (b) of the film or sheet before the heat treatment is 0.80 or more, preferably 0.9 or more, more preferably 0.95 or more.

When the temperature in heat treatment is higher than the melting point of the resin, the rolled film or sheet is melted, so that it cannot retain its normal shape any more. When the heat treatment is carried out at a temperature lower than the rolling temperature, it is impossible to sufficiently provide the rolled film or sheet with the effect of the heat treatment.

When the ratio (B/b) of the width (B) of the film or sheet after the heat treatment to the width (b) of the film or sheet before the heat treatment is less than 0.80, the tensile strength in the transverse direction of the rolled film or sheet cannot be improved.

As a heating means, a heating oven, a heating bath, a heating roll and a heating plate can be utilized, and these heating means may be employed singly or in a combination thereof to repeatedly perform the heat treatment.

A time t: second) of the heat treatment in the present invention depends upon the rolling temperature (Tr: C), the temperature Ta: C) of the heat treatment, the melting point Tm: .C) of the resin, and the thickness reduction r:%) and thickness (d: mm) of the rolled film or sheet. In consequence, the present inventors have found, on the basis of the intensive researches, that the time of the heat treatment should be in the range represented by the following formula:

$$\frac{0.641 \times d \times r \times (Tm - Ta)}{(Ta - Tr)^{0.5}} \leq t \leq 120$$

When the time of the heat treatment is shorter than in the range of the above formula, the effect of the heat treatment cannot be obtained sufficiently. On the contrary, when the time of the heat treatment is longer than 120 seconds, such a long period of time is industrially uneconomical, and the film or sheet sags and wrinkles, which impairs the appearance of the products.

The heat shrinkage in the present invention can be defined as a shrinkage of the film or sheet at the time when the latter is subjected to the heat treatment at a temperature 5° C. lower than the melting point of the resin for 30 minutes.

BRIEF DESCRIPTION OF THE DRAWING

FIG. 1 is an explanatory view of a specimen which is used to measure a heat shrinkage in the present invention.

Five or more of such specimens as in FIG. 1 are sampled, and a gage length is adjusted to 100 mm, and the gage marks in longitudinal and transverse directions of a film or sheet are marked. These specimens are placed horizontally for 30 minutes on a gear type aging test machine which is maintained at a temperature 5° C. lower than the melting point of the resin, and hey are then allowed to cool at 23° C. for 12 hours or more. Afterward, each of the longitudinal gage length and the transverse gage length is measured, and shrinkages in longitudinal and transverse directions are calculated in accordance with the following formula:

Shrinkage (%) = (1 − gage length (mm) after heating / 100) × 100

The specimens curve slightly at times as a result of the heating, and thus length of an arc between the gage marks of the specimens is measured.

In the rolled film or sheet obtained in the present invention, it is necessary that the heat shrinkage measured in the above-mentioned manner is 20% or less, preferably 10% or less. When the heat shrinkage is in excess of 20%, the rolled film or sheet tends to break when formed and some problems occur which are, for example, the warp and spring back of the products.

In the rolled film or sheet which has been subjected to the heat treatment of the present invention, it is found that the tensile yield strength or tensile strength (hereinafter referred to generally as "tensile strength") in the transverse direction measured in accordance with JIS K7113 is 10% or more higher than tensile strength in the transverse direction of the rolled film or sheet before the heat treatment.

Furthermore, it is found that the tensile strength in the transverse direction is 20% or more higher than the tensile strength in the transverse direction before the heat treatment, when the heat treatment is carried out for the time t which is twice or more as much as the time calculated in accordance with the above-mentioned formula but which is not in excess of 120 seconds.

The raw sheet used in the present invention which will be rolled may be manufactured by a known forming method such as a T-die method or an inflation method. Moreover, the desired sheet may be a single-layer sheet or a multi-layer sheet having two or more layers.

The melting point of the film or sheet referred to in the present invention denotes a temperature at the top of a peak on a DSC curve measured in accordance with JIS K7121.

According to the present invention, the heat shrinkage of the rolled film or sheet of the crystalline thermoplastic resin at the time of the heating can be remarkably inhibited, and additionally the tensile strength in the transverse direction can also be improved.

The rolled heat-treated films or sheets obtained by the present invention are excellent in formability, and thus when they are formed, neither warp nor spring back occurs. Therefore, productivity and quality of the products are high.

The manufacturing process of the present invention can be easily performed by the use of simple facilities without requiring any specific devices, and it is fair to say that the present invention has a very great economical merit.

EXAMPLES

The present invention will be described in detail in reference to examples and comparative examples, but the scope of the present case should not be limited to these examples.

In the examples, the appearance of products was evaluated by visually observing sags and wrinkles on films or sheets after heat treatment. Furthermore, the formability of the film or sheet was evaluated by visually observing warp, strain and breakage of the films or sheets after the thermoforming, and good and bad results were denoted by 0 and X, respectively.

Examples 1 and 2 and Comparative Examples 1 to 4

Each polypropylene homopolymer sheet (hereinafter referred to simply as PP, MFR 1.0 g/10 min., density 0.90 g/cc, melting point 162° C.) having a thickness of 1.5 mm and a width of 250 mm was fed to between a pair of rolls having a diameter of 300 mm, a width of 400 mm and a temperature of 110° C. in order to obtain a sheet having a thickness of 0.40 mm. The thus obtained rolled sheet was then thermally treated at temperatures of 150° C. and 155° C., respectively, for a period of 60 seconds by the use of a pair of heating rolls having a diameter of 300 mm and a width of 400 mm. This sheet was fixed by a cramp frame and then heated at an atmospheric temperature of 200° C. for 15 seconds by the use of an infrared heater. Afterward, a 100 mm-wide, 50 mm-long and 20 mm-deep tray was formed at a pressure of 5 kg/cm² by a straight pressure forming system.

Table 1 shows the results of heat shrinkage, tensile strength in a transverse direction, appearance and formability of each sheet. The results of comparative examples are also shown in Table 1. Here in Comparative Example in no heat treatment was performed, in Comparative Example 2, the rolling conditions were identical, but the heat treatment temperature only was changed to 130° C.; in Comparative Example 3, the heat treatment time only was changed to 10 seconds: and in Comparative Example 4, the heat treatment time only was changed to 180 seconds.

Examples 3 and 4. Comparative Examples 5 to 7

Each ethylene-propylene random copolymer (hereinafter referred to simply as "R-PP; melt flow rate 2.2 g/10 minutes, density 0.90 g/cc; melting point 142° C.; ethylene content 4 mole; and propylene content 96 mole) having a thickness of 1.5 mm and a Width Of 25% mm was rolled at a rolling temperature of 90° C. by the same procedure as in Example 1 in order to obtain a sheet having a thickness of 0.42 mm. This rolled sheet was then subjected to a heat treatment at temperature of 125° C. and 135° C., respectively, for 90 seconds by a pair of heating rolls having a diameter of 300 mm and a width of 400 mm.

This sheet was fixed by a cramp frame and was then heated at an atmospheric temperature Of 17Q C for 15 seconds by the use of an infrared heater. Afterward, a 100 mm-wide, 50 mm-long and 20 mm-deep tray was formed at a pressure of 5 kg/cm² by a straight pressure forming system.

Table 1 shows the results of heat shrinkage, tensile strength in a transverse direction, appearance and formability of each sheet.

The results of comparative examples are also shown in Table 1 Hereupon, in Comparative Example 5, no heat treatment was performed; in Comparative Example 6, the heat treatment time only was changed to 10 seconds; and in Comparative Example 7, the heat treatment time only was changed to 180 seconds.

Examples 5 and 6, Comparative Example 8

Each ethylene-propylene block copolymer sheet (hereinafter referred to simply as "B-PP": melt flow rate 0.5 g/10 minutes, density 0.91 g/cc; melting point 160° C.; ethylene content 8 mole %; and propylene content 92 mole %) having a thickness of 2.3 mm and a width of 250 mm was rolled at a rolling temperature of 110° C. by the same procedure as in Example 1 in order to obtain a sheet having a thickness of 0.35 mm. This rolled sheet was then subjected to a heat treatment at temperatures of 145° C. and 155° C., respectively, for 90 seconds by a pair of heating rolls having a diameter of 300 mm and a width of 400 mm. This sheet was fixed by a cramp frame and then heated at an atmospheric temperature of 200° C. for 15 seconds by the use of an infrared heater. Afterward, a 100 mm-wide, 50 mm-long and 20 mm-deep tray was formed at a pressure of 5 kg/cm² by a straight pressure system.

Table 1 shows the results of heat shrinkage, tensile strength in a transverse direction, appearance and formability of each sheet.

In Comparative Example 8, no heat treatment was performed, and its results are also set forth in Table 1.

Examples 7 and 8, Comparative Example 9

Each high-density polyethylene homopolymer sheet (hereinafter referred to simply as "PE"; melt flow rate 0.8 minutes, density 0.94 g/cc melting point 130° C.) having a thickness of 2.2 mm and a width of 250 mm was rolled at a rolling temperature of 90° C. by the same procedure as in order to obtain a sheet having a thickness of 0.45 mm. This rolled sheet was then subjected to a heat treatment at temperatures of 115° C. and 125° C., respectively, for 90 seconds in a hot-air type heating oven. This sheet was fixed by a cramp frame and was then heated at an atmospheric temperature of 150° C. for 10 seconds by the use of an infrared heater. Afterward, a 100 mm-wide, 50 mm-long and 20 mm-deep tray was formed at a pressure of 5 kg/cm² by straight pressure forming system.

Table 1 shows the results of heat shrinkage, tensile strength in a transverse direction, appearance and moldability of each sheet. In Comparative Example 9, no heat treatment was performed, and its results are also set forth in Table 1.

treatment temperature (°C), and Tm is the melting point ( C) of said crystalline resin.

2. A process for preparing rolled heat-treatment films or sheets according to claim 1 wherein said time (t: seconds) of said heat treatment satisfies the equation $$\frac{1.282 \times d \times r \times (Tm - Ta)}{(Ta - Tr)^{0.5}} \leq t \leq 120$$

wherein d is the thickness (mm) of said rolled films or sheets, r is the thickness reduction of said rolled films or sheets, Tr is the rolling temperature (°C), and Tm is the melting point (°C) of said crystalline resin.

3. A process for preparing rolled heat-treated films or sheets according to claim 1 wherein said rolling is carried out so that a ratio W/w) of the width (W) of said films or sheets after said rolling to the width (w) of said films or sheets before said rolling is 1.1 or less.

4. A process for preparing rolled heat-treated films or sheets according to claim 3 wherein said ratio W/w is 1.05 or less.

5. A process for preparing rolled heat-treated films or sheets according to claim 3 wherein said ratio W/w is 1.01 or less.

6. A process for preparing rolled heat-treated films or sheets according to claim 1 wherein prior to said heat treatment, said rolling is carried out so that a thickness

TABLE 1

|  | Resin | Melting Point (°C.) | Rolling Temp. (°C.) | Thickness Reduction (%) | Heat Treatment Temp. (°C.) | Longitudinal Heat Shrinkage (%) | Transverse Tensile Strength (kg/mm²) | Heat Treatment Time (seconds) | | Appearance | Formability |
|---|---|---|---|---|---|---|---|---|---|---|---|
|  |  |  |  |  |  |  |  | Found | Calcd. |  |  |
| Example 1 | PP | 162 | 110 | 73 | 150 | 18 | 3.83 | 60 | 36 | O | O |
| Example 2 | PP | 162 | 110 | 73 | 155 | 4 | 3.94 | 60 | 20 | O | O |
| Comp. Ex. 1 | PP | 162 | 110 | 73 | — | 42 | 3.16 | — | — | O | X |
| Comp. Ex. 2 | PP | 162 | 110 | 73 | 130 | 35 | 3.27 | 60 | 134 | O | X |
| Comp. Ex. 3 | PP | 162 | 110 | 73 | 155 | 26 | 3.42 | 10 | 20 | O | X |
| Comp. Ex. 4 | PP | 162 | 110 | 73 | 155 | 3 | 3.96 | 180 | 20 | X | O |
| Example 3 | R-PP | 142 | 90 | 72 | 125 | 19 | 2.80 | 90 | 56 | O | O |
| Example 4 | R-PP | 142 | 90 | 72 | 135 | 8 | 3.22 | 90 | 20 | O | O |
| Comp. Ex. 5 | R-PP | 142 | 90 | 72 | — | 39 | 2.50 | — | — | O | X |
| Comp. Ex. 6 | R-PP | 142 | 90 | 72 | 135 | 28 | 2.69 | 10 | 20 | O | X |
| Comp. Ex. 7 | R-PP | 142 | 90 | 72 | 135 | 5 | 3.25 | 180 | 20 | X | O |
| Example 5 | B-PP | 160 | 110 | 85 | 145 | 17 | 3.41 | 90 | 48 | O | O |
| Example 6 | B-PP | 160 | 110 | 85 | 155 | 9 | 3.74 | 90 | 14 | O | O |
| Comp. Ex. 8 | B-PP | 160 | 110 | 85 | — | 45 | 3.05 | — | — | O | X |
| Example 7 | HDPE | 130 | 90 | 80 | 115 | 12 | 3.17 | 90 | 69 | O | O |
| Example 8 | HDPE | 130 | 90 | 80 | 125 | 5 | 3.45 | 90 | 20 | O | O |
| Comp. Ex. 9 | HDPE | 130 | 90 | 80 | — | 63 | 2.89 | — | — | O | X |

Note 1: The symbols of the resins denote the following compounds:
R-PP ... Ethylene-propylene random copolymer
B-PP ... Ethylene-propylene block copolymer
HDPE ... High-density polyethylene homopolymer
Note 2: In all the specimens, transverse heat shrinkage was 2% or less.
Note 1: The calculated values of the heat treatment time were obtained from the formula:
$$\frac{0.641 \times d \times r \times (Tm - Ta)}{(Ta - Tr)^{0.5}}$$

What is claimed is:

1. A process for preparing rolled heat-treated films or sheets which comprises the steps of rolling a crystalline thermoplastic resin material between at least one pair of rolls at a temperature which is lower than the melting point of said resin material but higher than room temperature, and then subjecting said resin material to a heat treatment at a temperature which is higher than the rolling temperature but lower than the melting point of said resin material, said heat treatment being carried out for a time (t: seconds) satisfying the equation $$\frac{0.641 \times d \times r \times (Tm - Ta)}{(Ta - Tr)^{0.5}} \leq t \leq 120$$

wherein d is the thickness (mm) of said rolled films or sheets, r is the thickness reduction of said rolled films or sheets, Tr is the rolling temperature (°C), Ta is the heat reduction of said rolled films or sheets is in the range to 90%.

7. A process for preparing rolled heat-treated films or sheets according to claim 1 wherein in said heat treatment, tension is applied in a longitudinal direction to said film or sheet is such that a ratio (B/b) of the width (B) of said film or sheet after said heat treatment to the width (b) of said films or sheets before said heat treatment is 0.8 or more.

8. A process for preparing rolled heat-treated films or sheets according to claim 7 wherein said tension in a udinal direction in said heat treatment is such that said ratio (B/b) is 0.9 or more.

9. A process for preparing rolled heat-treated films or sheets according to claim 7 wherein said tension in a longitudinal direction in said heat treatment is such that said ratio (B/b) is 0.95 or more.

* * * * *

UNITED STATES PATENT AND TRADEMARK OFFICE
CERTIFICATE OF CORRECTION

PATENT NO. : 5,069,855
DATED : December 3, 1991
INVENTOR(S) : Takasu et al It is certified that error appears in the above-identified patent and that said Letters Patent is hereby corrected as shown below:

Column 8, line 2, change "(C)" to --(°C)--;

line 16, change "W/w)" to --(W/w)--;

line 52, after "range" insert --of 30%--;

line 58, change "film" to --films--;

change "sheet" to --sheets--;

line 63, change "udinal" to --longitudinal--.

Signed and Sealed this

Twenty-third Day of March, 1993

Attest:

STEPHEN G. KUNIN

*Attesting Officer*    Acting Commissioner of Patents and Trademarks